W. H. GARLOCK & R. COOKE.
Pump.

No. 217,089.   Patented July 1, 1879.

WITNESSES
Villette Anderson.
F. J. Masi.

INVENTORS
William H. Garlock,
Richard Cooke,
by E. W. Anderson
their ATTORNEY

UNITED STATES PATENT OFFICE.

WILLIAM H. GARLOCK AND RICHARD COOKE, OF DENISON, TEXAS.

IMPROVEMENT IN PUMPS.

Specification forming part of Letters Patent No. 217,089, dated July 1, 1879; application filed March 20, 1879.

*To all whom it may concern:*

Be it known that we, WILLIAM H. GARLOCK and RICHARD COOKE, of Denison, in the county of Grayson and State of Texas, have invented a new and valuable Improvement in Double-Acting Force and Suction Pumps; and we do hereby declare that the following is a full, clear, and exact description of the construction and operation of the same, reference being had to the annexed drawings, making a part of this specification, and to the letters and figures of reference marked thereon.

Figure 1:
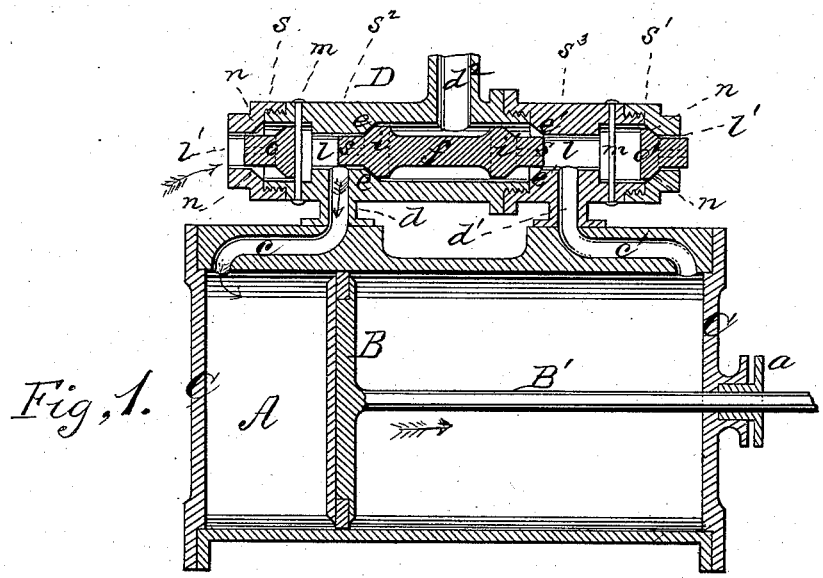
Figure 2:
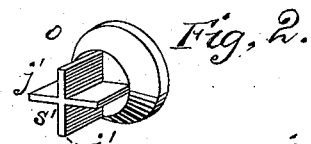
Figure 3:
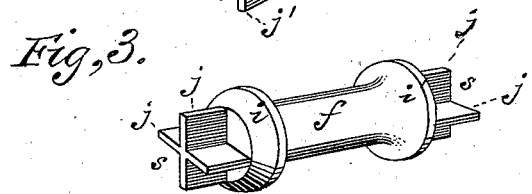

Figure 1 of the drawings is a representation of a longitudinal central section of my improved pump, and Figs. 2 and 3 are details.

This invention has relation to improvements in double-acting pumps.

The object of the invention is to devise a pump of this description having a series of valves, inducts, and educts, the valves working in a chamber, the whole arranged and constructed in such a manner as to allow the admission of water at one end of and its discharge at the other.

The nature of the invention consists in the combination and arrangement of the various devices used, as will be hereinafter more fully shown and described.

In the annexed drawings, the letter A designates the barrel or cylinder of the pump, having arranged therein, in the usual manner, a piston or plunger, B, actuated by a rod, B', extending through a stuffing-box, a, in one of the heads C.

$c\ c'$ designate passages opening into the cylinder at or near the end of the barrel A, and, extending inward toward each other, carried through the said barrel. These passages coincide, respectively, with ducts $d\ d^1$, leading into a chamber, D, rigidly secured in any suitable manner to the barrel A, and having an educt or nozzle, $d^2$, leading into an air-chamber when this device is used as a force-pump. At each side of this educt, within the chamber and inside of the ducts $d\ d^1$, are formed the valve-seats $e\ e'$, the same being annular, preferably beveled shoulders cast or otherwise formed in the said chamber. Between these shoulders, inside of the chamber, is an endwise-movable valve, $f$, having collars $i\ i'$, fitting snugly against the beveled shoulders aforesaid, and provided at each end with guide-stems $s$, working in a reduced or narrowed portion of the said chamber outside of the valve-seats $e\ e'$. These guide-stems are usually composed of two plates, $j$, at right angles to each other, as shown in Fig. 2; but any description of stem will suffice, provided it be made in open-work or skeleton form, and fit neatly in the reduced passages $l$ exterior to the collars or seats $e\ e'$.

The chamber D is open at each end, and inside of said openings are other valve-seats, $n$, working in connection with which are the valves $o\ o'$.

The seats $n$ are beveled, as shown in Fig. 1, and the body of each of the valves $o\ o'$ is correspondingly beveled to form tight joints with the seats. Each of these valves has a stem, $s'$, of skeleton form, or of crossed blades $j'$, as above described, projecting through a reduced passage, $l'$, at the ends of the chamber D. The inward movements of these valves are controlled by means of a rod, $m$, extending diametrically through the passage $l'$, as shown in Fig. 1.

The chamber D is usually made in four sections, S $S^1$ $S^2$ $S^3$, joined together by screw or flange joints. This is done with a view to the truing of the valve-seats, and to securing the exact coincidence of the ducts $d\ d^1$ and passages $c\ c'$, as well as for the introduction of the valves.

The operation of the pump is as follows:

The piston moving in the direction of the arrow creates a partial vacuum, which causes the valve $o$ to rise from its seat $n$, and the valve $f$ to close upon its seat $e$, opening a passage between the opposite seat, $e'$, the duct $d^1$ and educt $d^2$, and $o'$ to close upon its seat $n$. Water consequently is drawn through the passages $l'\ l$, duct $d$, and passage $c$ into the pump. The water on the other side of the piston is forced through passage $c'$, duct $d^1$, passage $l$, and nozzle $d^2$ into an air-chamber, pipe, or receptacle, as the case may be.

It will be plain that when the piston returns in the barrel the movements of the valves are reversed, and water is drawn through the other end of the chamber D.

What we claim as new, and desire to secure by Letters Patent, is—

In a double-acting pump, the combination, with the barrel A and piston B, the barrel having the passages $c\ c'$, of a chamber, D, open at each end, and having ducts $d\ d^1$, communicating with said passages, the inside valve-seats, $e\ e'$, an outlet, $d^2$, between said seats, the valve-seats near the ends of the said chamber, and the valves $o\ o'$ and $f$, the whole arranged and operating as set forth.

In testimony that we claim the above we have hereunto subscribed our names in the presence of two witnesses.

WILLIAM H. GARLOCK.
RICHARD COOKE.

Witnesses:
   JOHN G. WEST,
   JOHN J. WENDORFER.